(12) United States Patent
Luaces

(10) Patent No.: US 11,758,894 B2
(45) Date of Patent: Sep. 19, 2023

(54) FISH-HOLDING DEVICE

(71) Applicant: Pablo Luaces, Coral Springs, FL (US)

(72) Inventor: Pablo Luaces, Coral Springs, FL (US)

(*) Notice: Subject to any disclaimer, the term of this patent is extended or adjusted under 35 U.S.C. 154(b) by 0 days.

(21) Appl. No.: 17/512,838

(22) Filed: Oct. 28, 2021

(65) Prior Publication Data

US 2022/0132821 A1    May 5, 2022

(51) Int. Cl.
*A01K 97/14*    (2006.01)
*A01K 97/18*    (2006.01)

(52) U.S. Cl.
CPC .............. *A01K 97/14* (2013.01); *A01K 97/18* (2013.01)

(58) Field of Classification Search
CPC ................................ A01K 97/14; A01K 97/18
USPC ....... 43/5, 6, 53.5; 294/19.3, 26, 175, 103.1; 24/572.1, 573.09, 582.1, 582.11, 600.4, 24/600.5, 600.6, 600.7, 600.8
See application file for complete search history.

(56) References Cited

U.S. PATENT DOCUMENTS

| | | | | |
|---|---|---|---|---|
| 168,335 A | * | 10/1875 | Jincks ..................... | A01K 97/14 294/19.3 |
| 275,266 A | * | 4/1883 | Pullman ................... | F16B 45/04 24/600.7 |
| 275,537 A | * | 4/1883 | Straw ....................... | F16B 45/04 24/600.8 |
| 341,445 A | * | 5/1886 | Bristol .................... | F16B 45/04 24/600.8 |
| 345,923 A | * | 7/1886 | Riggle .................... | A44B 11/24 24/165 |
| 611,400 A | * | 9/1898 | Wenger ................... | A01K 83/02 43/34 |
| 647,714 A | * | 4/1900 | Baker ...................... | F16B 45/04 24/600.8 |
| 718,079 A | * | 1/1903 | Bindhammer ......... | A01K 97/14 294/19.3 |
| 759,806 A | * | 5/1904 | Broga ..................... | F16B 45/04 24/600.7 |
| 845,180 A | * | 2/1907 | Krafft ..................... | F24B 15/00 81/345 |

(Continued)

FOREIGN PATENT DOCUMENTS

EP        2465347 A1 *  6/2012  ............ A01K 97/00
JP     2018033342 A  *  3/2018

(Continued)

OTHER PUBLICATIONS

Translation of JP 2018-33342 (Year: 2018).*

*Primary Examiner* — Darren W Ark
(74) *Attorney, Agent, or Firm* — Eugenio J. Torres-Oyola; Victor M. Rodriguez-Reyes; Rafael Rodriguez-Muriel

(57) ABSTRACT

A fish-holding device, comprising a hollow tube (6) with a channel (12); a hook (1) attached to the distal end of the tube (6); a movable element (2) inserted in the hollow tube and guided along the channel by a release element (7) attached to the movable element, the movable element being guided for being slidable between a closed position, wherein an end of the movable element (2) abuts against a free and blunt end of the hook, and an open position, wherein the movable element is associated with a spring that biases the movable element towards the closed position; and wherein the channel (12) includes a plurality of lateral retaining grooves (5) configured to house the release element (7) in different positions along the channel.

8 Claims, 6 Drawing Sheets

(56) References Cited

U.S. PATENT DOCUMENTS

| | | | | |
|---|---|---|---|---|
| 949,750 | A * | 2/1910 | Bettis | A01K 97/14 294/19.3 |
| 967,486 | A * | 8/1910 | Avery | A44C 5/2028 267/74 |
| 1,072,672 | A * | 9/1913 | Sweet | A01K 83/04 43/79 |
| 1,120,735 | A * | 12/1914 | Moyer | B25J 1/04 294/22 |
| 1,164,528 | A * | 12/1915 | Knapp | B25J 15/026 294/119.1 |
| 1,187,193 | A * | 6/1916 | Smith | A01K 97/14 294/19.3 |
| 1,303,048 | A * | 5/1919 | Elliott | B66C 1/36 294/82.23 |
| 1,413,139 | A * | 4/1922 | Smith | F42B 30/14 294/100 |
| 1,521,387 | A * | 12/1924 | Pericle | F16B 45/04 24/600.7 |
| 1,604,725 | A * | 10/1926 | Sprangel | A01K 83/04 43/37 |
| 1,847,165 | A * | 3/1932 | Baxter | F16B 45/04 24/600.7 |
| 1,853,899 | A * | 4/1932 | Haverstick | F23J 1/04 294/11 |
| 1,934,801 | A * | 11/1933 | Hiner | A01K 15/003 119/806 |
| 1,952,990 | A * | 3/1934 | Peter | A01K 97/18 43/53.5 |
| 2,099,588 | A * | 11/1937 | Annema | A47J 29/06 294/166 |
| 2,155,913 | A * | 4/1939 | Thompson | A01K 97/14 43/6 |
| 2,216,499 | A * | 10/1940 | Ohotto | A44C 5/2028 24/600.6 |
| 2,243,305 | A * | 5/1941 | Adler | A47J 45/10 294/34 |
| 2,263,965 | A * | 11/1941 | Fiori | A01K 97/14 43/53.5 |
| 2,295,021 | A * | 9/1942 | Weiss | B60D 1/04 292/61 |
| 2,311,401 | A * | 2/1943 | Lange | A01K 97/14 294/104 |
| 2,481,007 | A * | 9/1949 | Dugdale | A01K 97/18 43/53.5 |
| 2,517,507 | A * | 8/1950 | Rowan | A01K 97/14 294/26 |
| 2,522,454 | A * | 9/1950 | Lewry | A01K 97/14 119/804 |
| 2,584,371 | A * | 2/1952 | Shackel | A01K 97/14 294/82.2 |
| 2,603,520 | A * | 7/1952 | Brown | A01K 97/14 294/26 |
| 2,619,759 | A * | 12/1952 | Penninger | A01K 83/02 43/44.8 |
| 2,625,976 | A * | 1/1953 | Reynolds | B60C 27/10 152/242 |
| 2,723,152 | A * | 11/1955 | Doty | A01K 97/14 294/19.3 |
| 2,747,321 | A * | 5/1956 | Thompson | A01K 97/18 43/53.5 |
| 2,759,758 | A * | 8/1956 | Yancey | A01K 97/14 294/82.17 |
| 2,807,495 | A * | 9/1957 | Pillstrom | A01K 15/003 119/807 |
| 2,924,482 | A * | 2/1960 | Gibson | A01K 97/14 43/37 |
| 3,311,398 | A * | 3/1967 | Erhardt | A01K 97/14 294/175 |
| 3,354,755 | A * | 11/1967 | Legrande | B25B 13/22 81/359 |
| 3,365,759 | A * | 1/1968 | Molzan | B64D 17/38 24/598.9 |
| 3,514,892 | A * | 6/1970 | Wormsbecker | A01K 97/18 43/53.5 |
| 3,531,148 | A * | 9/1970 | Rohde | B25G 3/02 294/26 |
| 3,707,800 | A * | 1/1973 | Wolfe | A01K 97/18 43/53.5 |
| 3,772,814 | A * | 11/1973 | Sylvester | A01K 81/00 43/6 |
| 3,811,158 | A * | 5/1974 | Merser | B63H 9/10 24/600.7 |
| 3,823,971 | A * | 7/1974 | Golden | A01K 97/14 294/19.3 |
| 3,859,693 | A * | 1/1975 | Breed | B63B 21/04 294/82.23 |
| 3,869,822 | A * | 3/1975 | Tieman | A01K 97/18 43/53.5 |
| 3,973,301 | A * | 8/1976 | Buhr | F16B 45/04 24/905 |
| 4,148,512 | A * | 4/1979 | Pendlebury | A01K 97/14 294/26 |
| 4,307,909 | A * | 12/1981 | Yaworski | B25B 9/04 294/103.1 |
| 4,351,126 | A * | 9/1982 | Simonson | A01K 97/14 294/26 |
| 4,372,016 | A * | 2/1983 | LaViolette | F16B 45/02 24/600.7 |
| 4,449,743 | A * | 5/1984 | Pankratz | B27B 29/00 294/103.1 |
| 4,598,492 | A * | 7/1986 | Stanfield | A01K 97/14 294/19.3 |
| 4,601,505 | A * | 7/1986 | Chilton | B65G 7/12 294/82.21 |
| 4,645,253 | A * | 2/1987 | Hogden, Sr. | A01K 97/14 D22/150 |
| 4,783,926 | A * | 11/1988 | McKinney | A01K 97/14 294/19.3 |
| 4,854,626 | A * | 8/1989 | Duke | A01K 97/14 294/104 |
| 4,934,089 | A * | 6/1990 | Samar | A01K 97/14 294/111 |
| 5,582,377 | A * | 12/1996 | Quesada | A47F 5/083 248/316.4 |
| 6,571,505 | B1 * | 6/2003 | Poiencot, Jr. | A01K 97/14 119/806 |
| 7,076,910 | B1 * | 7/2006 | Xifra | A01K 97/14 177/148 |
| 7,246,540 | B2 * | 7/2007 | Rillera | B25B 9/00 81/55 |
| 7,658,424 | B2 * | 2/2010 | Sviland | B66C 1/36 294/82.23 |
| 8,276,247 | B2 * | 10/2012 | Yang | F16B 45/02 24/600.2 |
| 10,010,144 | B2 * | 7/2018 | Godshaw | A45C 13/30 |
| 10,247,223 | B2 * | 4/2019 | Zivanovic | A45C 13/30 |
| 10,605,298 | B2 * | 3/2020 | Zavala Riva Palacio | A44B 13/02 |
| 11,484,021 | B2 * | 11/2022 | Xu | A01K 97/18 |
| 2005/0189153 | A1 * | 9/2005 | Yang | A01K 97/14 177/148 |
| 2007/0137008 | A1 * | 6/2007 | Anstee | A63B 29/02 24/600.7 |
| 2012/0158018 | A1 * | 6/2012 | Benedetti | A01K 97/00 606/131 |
| 2014/0325805 | A1 * | 11/2014 | Troiano | F16B 45/04 24/600.5 |
| 2015/0157153 | A1 * | 6/2015 | Gardeski | B25J 1/04 220/571 |

FOREIGN PATENT DOCUMENTS

| | | |
|---|---|---|
| JP | 2018143227 A * | 9/2018 |
| JP | 2019129728 A * | 8/2019 |
| JP | 6826944 B2 * | 2/2021 |
| JP | 6928378 B2 * | 9/2021 |

* cited by examiner

FISH-HOLDING DEVICE

OBJECT OF THE INVENTION

The present invention is particularly aimed at a handheld device or at an articulated structure which may be used by a fisherman to successfully unload a medium or large and heavy fish, in particular to be used in recreational and sport fishing when it is required that the specimen be released after its capture, where it is necessary to measure and pose with the fish specimen, in such a way that the device allows for the holding of the specimen and the safe withdrawal of the fish hook without harming the specimen.

BACKGROUND OF THE INVENTION

Many types of gaffs or similar fishing equipment have been used with the purpose of aiding the fishermen to unload large and heavy fish, which consisted, generally, in a long rod or a handle with a strong and sharp fish hook firmly attached to an end of the stick. In some of these structures, a sharp structure was used for the same purpose in the shape of a spear which has a curved end integral with a barb close to its sharp tip.

The two types of gaff hook structures previously described have many disadvantages, including the fact that they are normally rather heavy and hard to use when carrying out their intended function, especially for a lone fisherman, or fishermen in small vessels, such as kayaks or canoes. In many cases, the use of the current holding devices ends up killing the fish, or harming it to such an extent that they will cause its death in a short time; large fish have escaped from the gaff or from the fishing equipment by violently spinning their body, thus separating themselves from the structure of a single gaff which simply penetrates one side of the fish, which results in the loss of the fish or the need to use another gaff or fish hook to ensure a successful landing of the fish.

Other types of fish hook structures haven been used which employ a plurality of curved and pivoting fish hooks actuated by the fish pulling on one single baited fish hook to simultaneously impale the body of the fish in several places to aid a fisherman to unload a large fish. However, these devices only aid in drawing the fish closer to the fishing boat and, since they are connected to a flexible fishing line or cable, they would fail to aid the fisherman to lift and land a large and heavy fish in the boat.

Traditionally, fishermen have used gaff hooks to hold the fish and reduce the likelihood of the fish escaping by diving and unhooking its mouth from the fish hook. However, the single gaff hooks which are attached to the gaff handle are not always reliable for safely holding a fish, owing to their one-sided nature.

A series of gaffs and double gaffs have been developed to further secure the fish. Because the double fish hooks approach the fish from both sides, it is generally necessary that these fish hooks should toggle between the open and closed positions.

In the state of the art a variety of mechanisms exists to toggle double opposing gaff hooks. The known designs are largely based on spring-loaded mechanisms which use rods to force the transition of the gaff hooks from the open to the closed position.

U.S. Pat. No. 7,076,910 provides a device to lift and control a fish outside the water. Not limited to a captured fish during the sport of rod fishing, for scientific purposes, etc., the device of the present invention may be useful to handle and control the captured fish bound to be released into the water, unharmed, after being measured and/or weighed for any purpose. The device comprises a main casing; a pair of clamps for the specimen pivotally joined to said main housing; a trigger assembly movable in a direction substantially parallel relative to and along a first portion of said main housing to toggle said pair of clamps from a normally "closed" position to a fully "open" position; where said clamps are locked in the fully "open" position and, once locked, they remain locked in the fully "open" position without manual assistance; and a release assembly to unlock said pair of clamps, wherein, once released, said clamps automatically return to the "closed" position without manual assistance and remain in the "closed" position without manual assistance; wherein said trigger assembly comprises a slidable outer sleeve arranged along a first portion of said main housing and an axis pin fastened to said outer sleeve and extending through said first portion of said main housing and said pair of clamps; wherein said release assembly comprises a fitting arranged between said outer sleeve and said first portion of said main housing and a push button assembly operatively associated with said fitting, said axis pin extending through said fitting, which causes said fitting to move with the movement of said outer sleeve of the fitting.

U.S. Pat. No. 6,571,505 discloses an apparatus for holding a live or dead fish, the apparatus comprising fish gripping tongs having clamps on the distal end thereof for their placement on the inside and outside of the mouth of the fish, said tongs having a. an elongated finger gripping member to be gripped by the user's fingers, said finger gripping member having two arms that extend perpendicularly therefrom, said two arms and said finger gripping element being on the same plane, said two arms being arranged on opposite ends of said finger gripping element, and b. a generally rectangular hollow tong box slidingly receiving said tongs therein, said box being adapted to force said tongs to close together when said finger gripping member is gripped by the user's fingers to drag said distal end of said tongs to said box.

The various systems designed in the previous art focus on the vigorous hooking by means of toothed hooks which adjust to the fish jaws for a secure hold, but, on many occasions, they are harmful for the specimen, in particular for sport fishing, wherein the specimen is released in the spot where it was caught. The unidirectional assistance creates a hindrance to the opposing movement of opening the teeth of the gaff, after the fish is secure. It would be desirable to provide a system which reliably aids both the opening and the closing of the gaff without harming the fish and where the device may be adjusted according to the weight of the specimen.

The present invention satisfactorily solves the existing problem in the art, since the device of the invention allows for the secure holding of a fish independently of its size or weight without harming the specimen, as the gaff of the device lacks teeth and also has a device that allows for the adjustment of the hold depending on the weight of the specimen.

DESCRIPTION OF THE DRAWINGS

To complement the description that is being presented and with the object of promoting a better understanding of the features of the invention, according to a preferred example of the practical embodiment thereof, a set of drawings is attached as an integral part of said description, wherein the following is displayed with an illustrative and non-limiting character.

DESCRIPTION OF THE INVENTION

Figure 1:
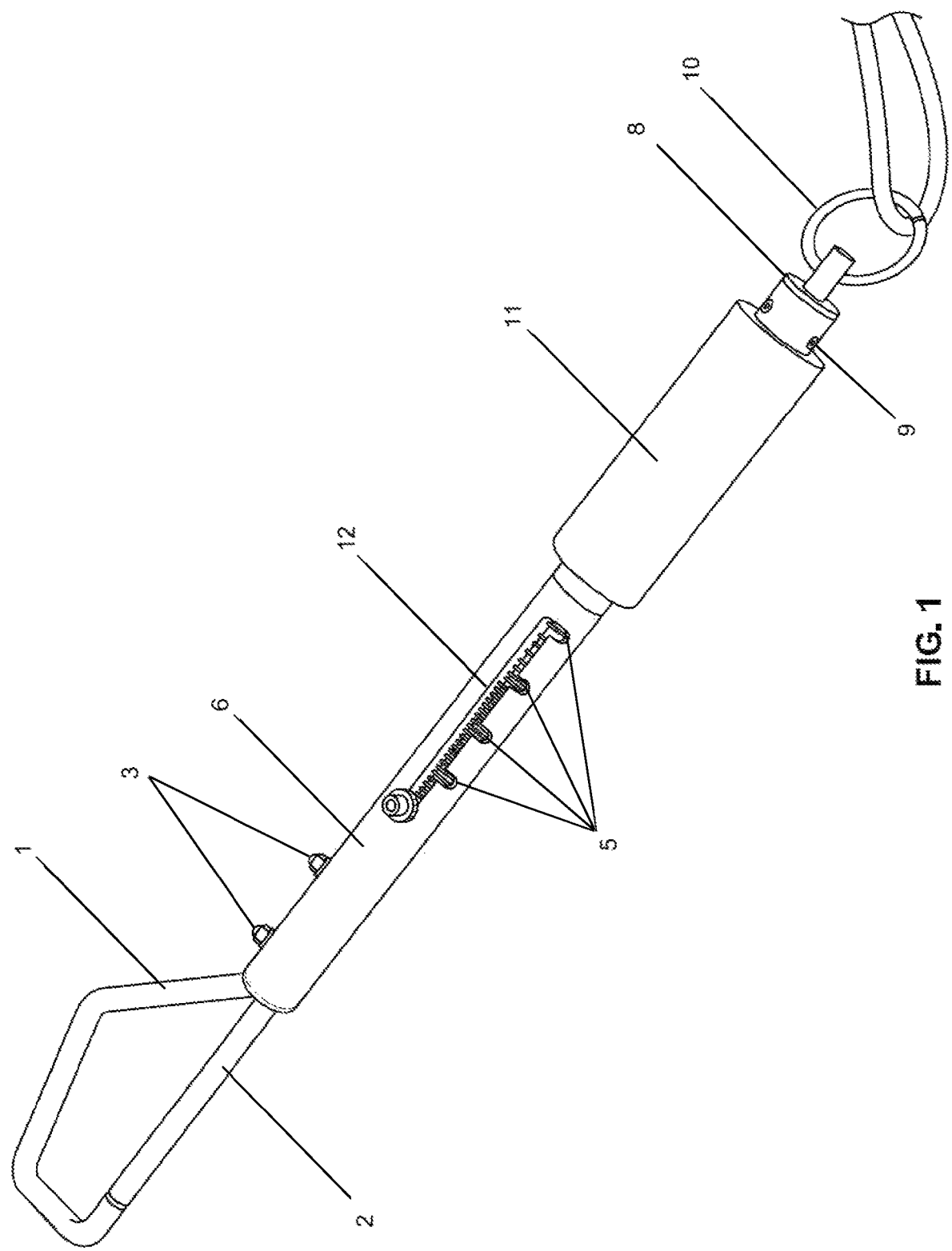
FIG. 1 shows a perspective view of the device of the invention, wherein its essential elements are shown.
Figure 2:
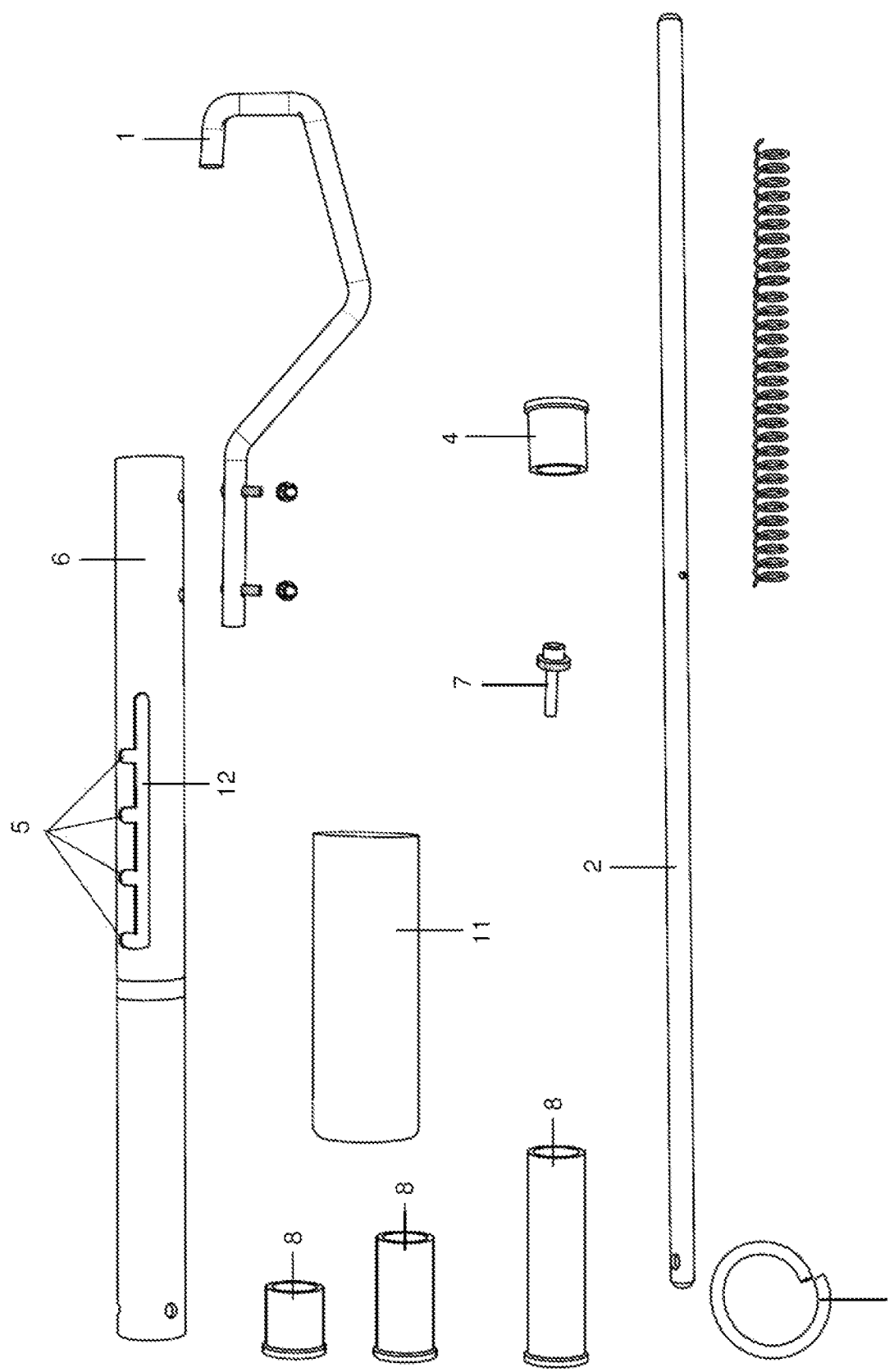
FIG. 2 shows a disassembled view of the device shown in FIG. 1.
Figure 3:
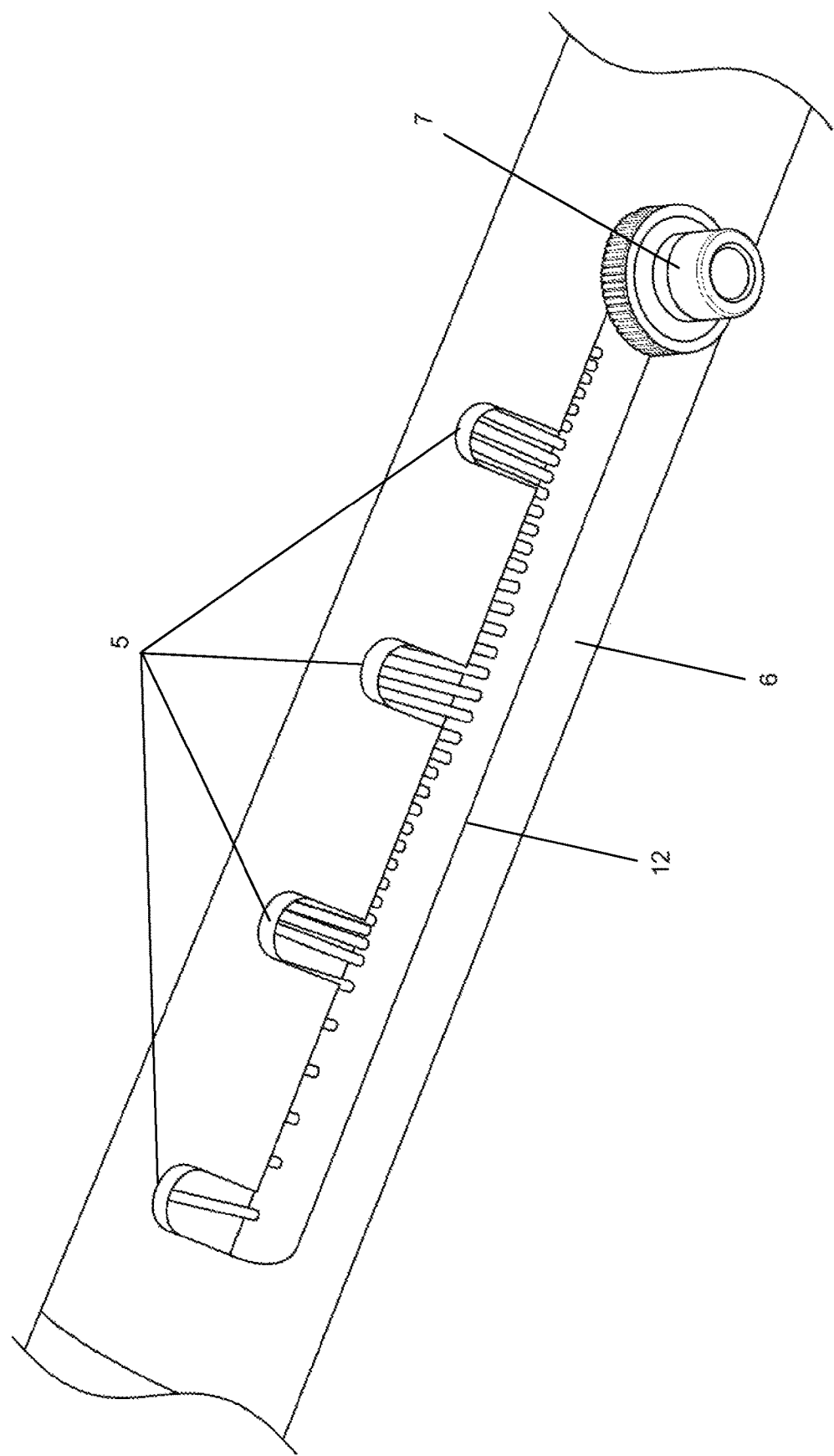
FIG. 3 shows a zoomed view of the channel, including the plurality of lateral retaining grooves configured for housing the release element.
Figure 4:
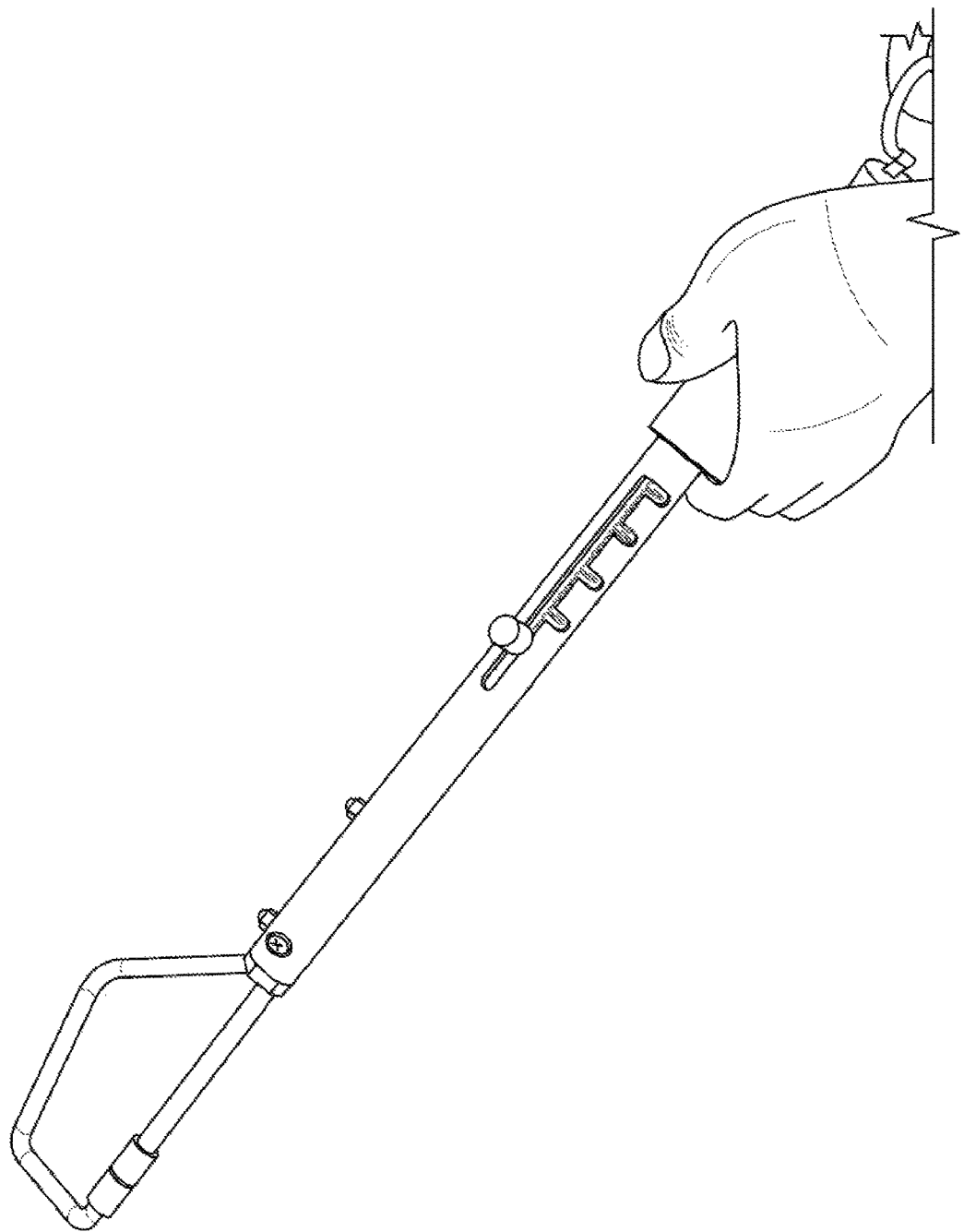
FIG. 4 shows the device shown in FIG. 1, held by a user, the free ends of the hook and of the movable element, facing each other, including a protective cap.
Figure 5:
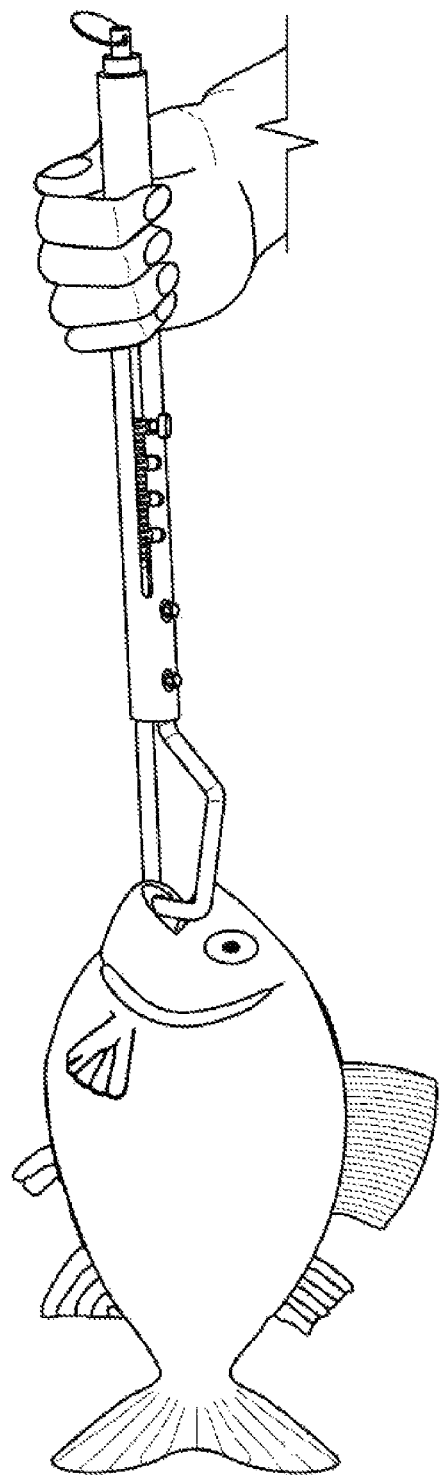
FIG. 5 shows the device shown in FIG. 1, held by a user, and holding a fish.
Figure 6:
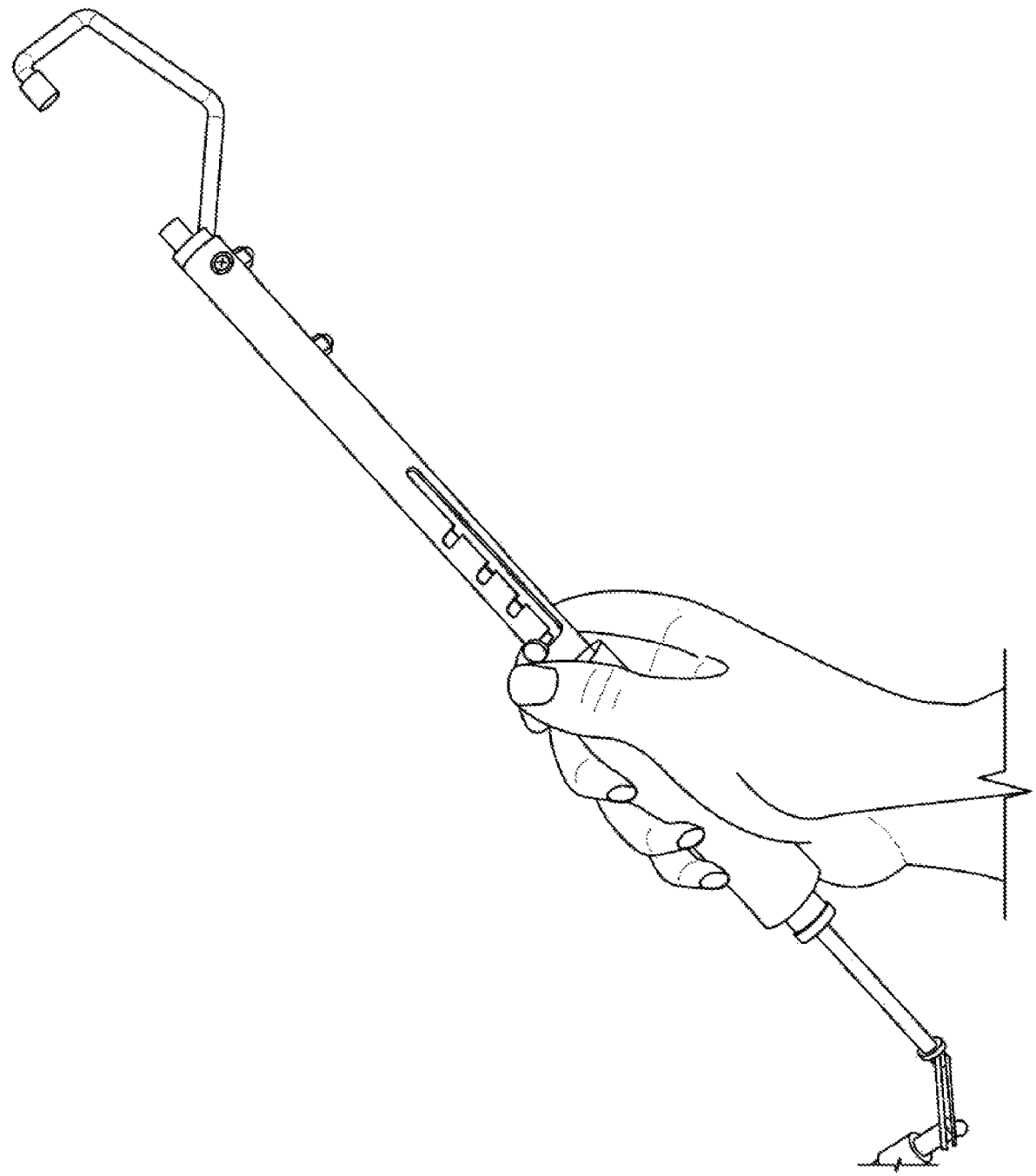
FIG. 6 shows the device shown in FIG. 4 with the free end of the movable element spaced apart from the free end of the hook.

The present invention discloses a fish-holding device for unloading medium, large or heavy fish for drawing the fish to the vessel for the removal of the fish hook in a secure way for both the fish and the fisherman, and holding it held for its measurement in sporting competitions. The device allows the holding of a fish, which has jaws, on the distal end thereof by placing portions of the device on the inside and on the outside of the mouth of the fish, closing around it.

The proposed fish-holding device comprises:

a hollow tube 6 with a distal end, a proximal end, and with a channel 12;

a hook 1 attached to the distal end of the tube 6;

a movable element 2 inserted in the hollow tube and guided, along the channel, by a release element 7 attached to the movable element, the movable element being slidable in a direction parallel to the hollow tube between a closed position, wherein an end of the movable element 2 abuts against a free and blunt end of the hook, and an open position wherein the end of the movable element 2 remains separated from the free and blunt end of the hook;

wherein the movable element is associated with a spring 13 that biases the movable element towards the closed position; and wherein the channel 12 includes a plurality of lateral retaining grooves 5 configured to house the release element 7 in different positions along the channel, retaining the movable element in the open position at different distances from the free and blunt end of the hook.

Therefore, the sliding of the movable element between the closed position and the open position will be guided by the sliding of the release element along the channel, which is parallel to the longitudinal axis of the hollow tube, limiting and guiding the sliding of the movable element in said direction parallel to the longitudinal axis of the hollow tube.

Therefore, it is proposed that said device have a body comprising, on its distal portion, a stainless-steel hook 1 arranged in such a way that one of its ends is attached to a stainless-steel tube 6 and the other free end abuts against a stainless-steel movable element 2 of the same thickness as the hook 1. The hook is fastened at the distal portion of the device to the tube 6 and is parallel to the hook 1, by means of a plurality of screws 3 with their respective nuts and wherein said movable element 2 is inserted at an end in a spring 13, for its shifting and movement within said tube 6, allowing for its release by means of a release element 7, which allows for the shifting of said movable element 2 within a release channel 12 comprising a plurality of grooves 5 arranged in the tube 6 and which serve as a guide for the compression or elongation of the spring 13, thereby causing the movable element 2 to shift within the release channel 12 and its end to contact the free end of the hook 1 allowing for its closure, as a ring-like shackle.

Preferably, the movable element will be a straight bar having the potential of rotation within the hollow tube enabling the insertion and removal of the release element into/from the lateral retaining grooves of the channel by means of the rotation of the movable element.

It is also proposed that a grip be fastened to the movable element and protrude from the hollow tube through the proximal end, making it possible to pull on the grip causing the compression of the spring and the distancing of the end of the movable element from the free and blunt end of the hook.

Preferably, the spring 13 is within the hollow tube, encircling the movable element. In this case, the proximal end of the tube may include, attached thereto, a cap on which a spring end rests internally, against the surface thereof contained in the tube. The movable element may exit the proximal end of the hollow tube going through said cap.

So, an end of the spring 13 rests on a rear nylon cap 8 arranged close to the proximal portion of the hollow tube of the device which allows to keep said spring compressed within the body 6 and wherein a stainless-steel bar 2, constituting the movable element, when pulled backwards by means of the ring 10, allows for the compression of the spring 13, the compression of said spring being adjusted by means of the location of the release element 7 in the different grooves 5 of the release channel 12 where the spring 13 is located, so that, the greater the traction of the bar 2, the greater the compression and the closing force, all this depending on the weight of the fish, the release channel 12 adjusting the optimal force for holding the fish without harming it.

Optionally, the attachment between the cap and the proximal end of the tube can be configured to provide a plurality of attachment positions of the cap, at different longitudinal positions within the tube, allowing for the modification of the position of the surface of the cap on which the spring end rests, modifying the spring compression.

Alternatively, the holding device may include a set of caps with different lengths, the cap attached to the tube being one selected among said set of caps, and the attachment between the cap and the tube being a releasable attachment, allowing for the replacement of the cap for a different cap of the set of caps, modifying the position of the surface on which the spring end rests and thus modifying the spring compression.

According to an embodiment of the invention, the portion of the hook containing the end of the hook is parallel to the hollow tube and coaxial with the portion of the movable element containing the end of the movable element.

The body of the fish-holding device of the invention also comprises a handle 11 for handling and for the comfort of the user. The tube 6 is closed on the distal side by means of a first nylon cap 4 and on the proximal portion by a second nylon cap 8 which is attached by means of a screw 9, in such a way that said first 4 and second 8 nylon caps, ensure the water-tightness of the interior portion of said tube 6.

The device is susceptible to the exchange of the cap 8 to allow the spring pressure to vary in a more adequate adjustment and to adapt to the needs of the fisherman depending on whether the latter is conducting a sport activity at sea or in fresh water.

To hold the fish by the jaws, first of all, the release element 7 is actuated so that the spring 13 is compressed and shifts the movable element 2, separating it from the free and blunt end of the hook, allowing for the opening of the device, going on to retain the movable element in the open position by inserting the release element in one of the grooves of the channel. Next, the free end of the hook 1 is placed on the inside portion of the mouth of the fish and the freed end of the movable element 2 on the outer part of the mouth of said fish; next, the release element 7 is actuated to remove it from the groove, causing the spring 13 to return to its original position, in such a way that the movable element 2 is shifted, firmly holding the fish but without harming the jaws of the fish, as the system closes as a ring-like shackle; this also confers sufficient stability, since, depending on the weight of the fish, the user may compress the spring 13 using the grooves 5 of the release channel 12 as a guide by means of the ring 10; that is, depending on the weight of the fish, the spring 13 may adjust its elongation within the release channel 12 with the different grooves 5 and by means of the ring 10 located in the proximal portion, conferring to the spring 13 greater or lesser compression, so that the restoring force of the spring 13 will be greater or lesser depending on the needs of the user based on the weight of the fish.

After the fish is held, the fisherman may set the position of the bar 2 by rotating the release element 7 towards the left within the grooves of the release channel 12. This way, the fish will be firmly held in the groove corresponding to the dimensions of its mouth, without being harmed.

The invention claimed is:

1. A fish-holding device, comprising:
   a hollow tube with a distal end, a proximal end, and a channel;
   a hook attached to the distal end of the tube;
   a movable element inserted in the hollow tube and guided, along the channel, by a release element attached to the movable element, the movable element being slidable in a direction parallel to the hollow tube between a closed position, wherein an end of the movable element abuts against a free and blunt end of the hook, and an open position, wherein the end of the movable element remains separated from the free and blunt end of the hook;
   the movable element is associated with a spring that biases the movable element towards the closed position; and
   the channel includes a plurality of lateral retaining grooves configured for housing the release element in different positions along the channel, retaining the movable element in the open position such that the end of the movable element is at different distances from the free and blunt end of the hook which correspond to the different positions along the channel;
   wherein the proximal end of the hollow tube includes, attached thereon, a cap which includes a surface on which an end of the spring rests; and
   wherein the cap attached to the proximal end of the hollow tube is one cap selected among a set of caps with different lengths, the attachment between the cap and the proximal end of the hollow tube being a releasable attachment, allowing the replacement of the cap attached to the proximal end of the hollow tube for a different cap of the set of caps, modifying the position of the surface on which the spring end rests and thus modifying the spring compression.

2. The holding device according to claim 1, wherein the movable element is a straight bar having the potential of rotation within the hollow tube, enabling the insertion and removal of the release element into/from the lateral retaining grooves of the channel by means of the rotation of the movable element.

3. The holding device according to claim 1, wherein a grip is fastened to the movable element and protrudes from the hollow tube through the proximal end, enabling the movement of the release element away from the free and blunt end of the hook, causing the compression of the spring, by pulling the grip.

4. The holding device according to claim 1, wherein the spring is within the hollow tube, encircling the movable element.

5. The holding device according to claim 1, wherein a portion of the hook, which includes the free and blunt end of the hook, is parallel to the hollow tube and coaxial with a portion of the movable element having the end of the movable element.

6. The holding device according to claim 1, wherein the hollow tube includes a handle around a half of the hollow tube closer to the proximal end thereof.

7. The holding device according to claim 1, wherein the hook, the movable element, and the tube are manufactured from stainless steel.

8. The holding device according to claim 1, wherein the cap attached to the proximal end of the tube closes the proximal end of the hollow tube and is a first nylon cap which is attached to the hollow tube by a screw and wherein the hollow tube is closed on the distal end by a second nylon cap.

* * * * *